(12) United States Patent  (10) Patent No.: US 7,492,074 B1
Rittenhouse  (45) Date of Patent: Feb. 17, 2009

(54) HIGH-EFFICIENCY WHEEL-MOTOR UTILIZING MOLDED MAGNETIC FLUX CHANNELS WITH TRANSVERSE-FLUX STATOR

(76) Inventor: Norman Rittenhouse, 1001 N. First St., Fairbury, IL (US) 61739

( * ) Notice: Subject to any disclaimer, the term of this patent is extended or adjusted under 35 U.S.C. 154(b) by 34 days.

(21) Appl. No.: 11/731,427

(22) Filed: Mar. 30, 2007

(51) Int. Cl.
*H02K 1/00* (2006.01)
(52) U.S. Cl. .................. 310/265; 310/216; 310/218
(58) Field of Classification Search ............. 310/43–44, 310/216–218, 254, 265
See application file for complete search history.

(56) References Cited

U.S. PATENT DOCUMENTS

| | | | |
|---|---|---|---|
| 3,665,227 A * | 5/1972 | Busch ........................ | 310/46 |
| 4,625,392 A | 12/1986 | Stokes ........................ | 29/598 |
| 4,853,567 A | 8/1989 | Muramatsu et al. .......... | 310/67 |
| 5,533,587 A | 7/1996 | Dow et al. .................. | 180/235 |
| 5,777,413 A | 7/1998 | Nagata et al. ................ | 310/90 |
| 6,044,921 A | 4/2000 | Lansberry ................... | 180/9.36 |
| 6,220,377 B1 | 4/2001 | Lansberry ................... | 180/9.36 |
| 6,492,756 B1 * | 12/2002 | Maslov et al. .......... | 310/156.12 |
| 2003/0193263 A1 * | 10/2003 | Maslov et al. ............... | 310/254 |

* cited by examiner

*Primary Examiner*—Tran Nguyen
(74) *Attorney, Agent, or Firm*—Brian S. Steinberger; Phyllis K. Wood; Law Offices of Brian S. Steinberger, P.A.

(57) ABSTRACT

A motor including a mounting shaft having a hollow channel and a bearing attached to each end, a cylindrical hub having a hollow core for the mounting shaft, and plural rows of plural Molded Magnetic Flux Channels with a hollow core and a channel forming a U-shaped recess and mounted the surface of the hub, each row corresponding to a motor phase. Each magnetic flux channel forms two pole pieces divided by the channel. The motor also includes plural phase windings, one passing through each row of plural Molded Magnetic Flux Channels, a rotating drum having plural rows of permanent magnets on an inner surface, each row pair corresponding to and aligned with one of the plural rows of Molded Magnetic Flux Channels. The rotating drum connected with the bearing, and drive electronics for driving the plural phase windings, wherein the plural Molded Magnetic Flux Channels increases torque and motor efficiency.

24 Claims, 17 Drawing Sheets

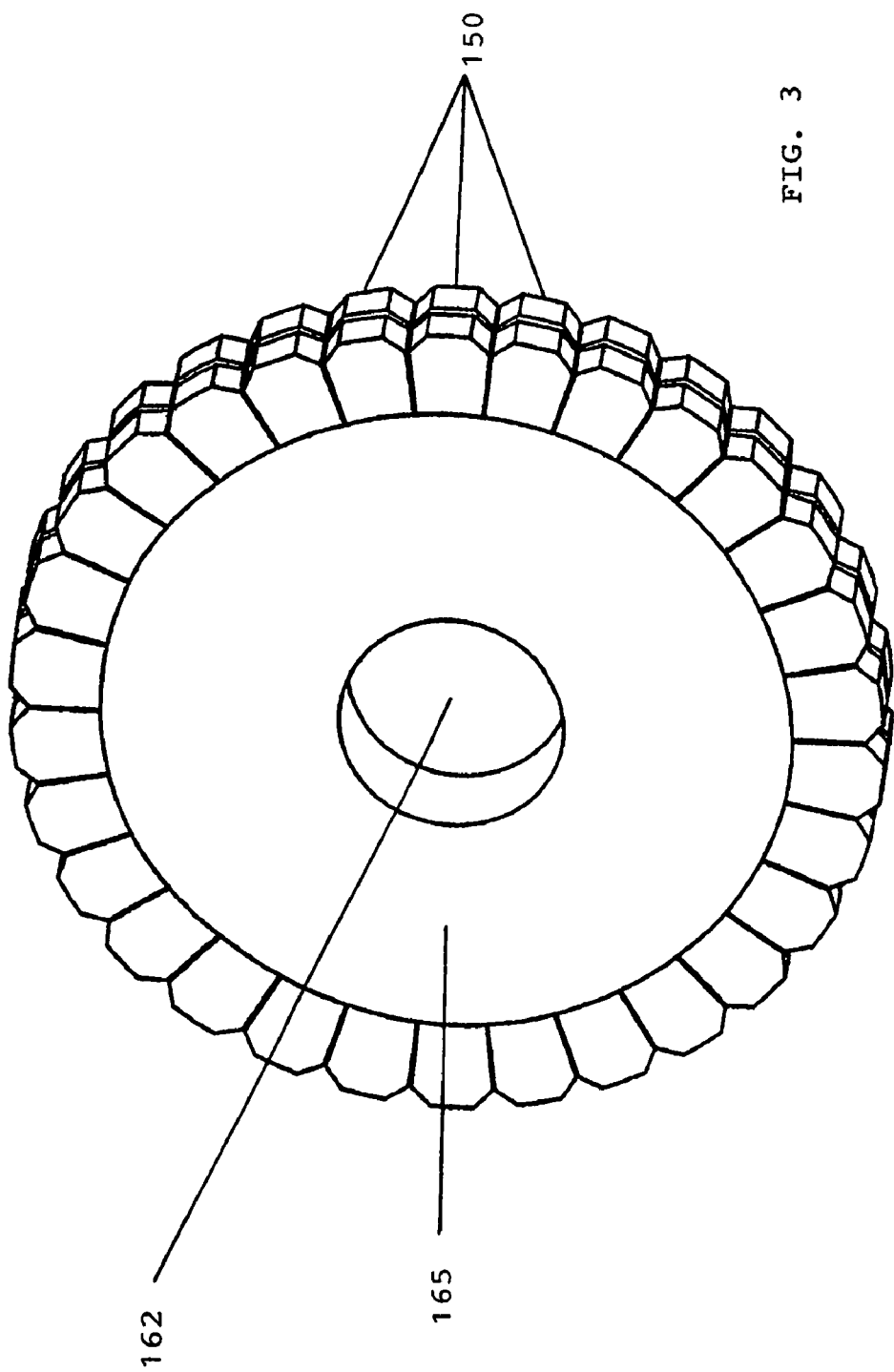

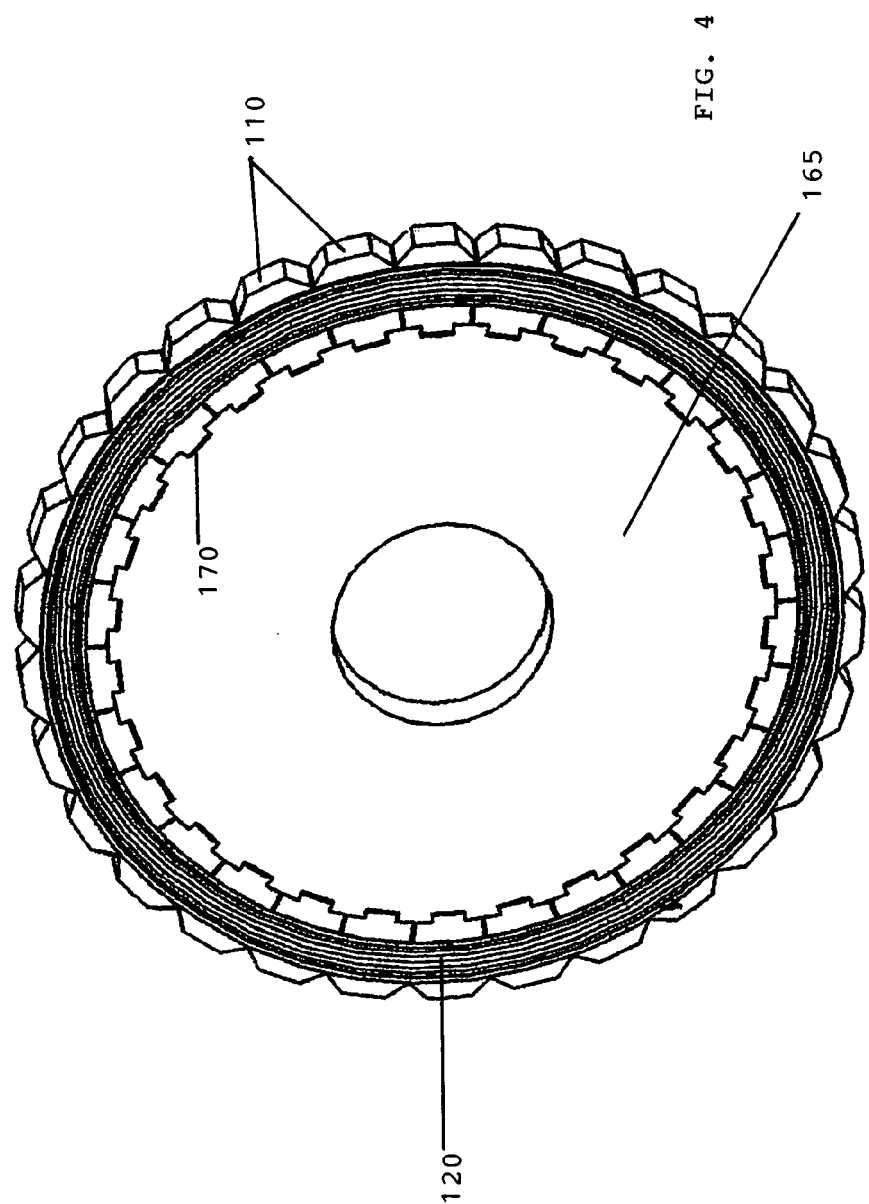

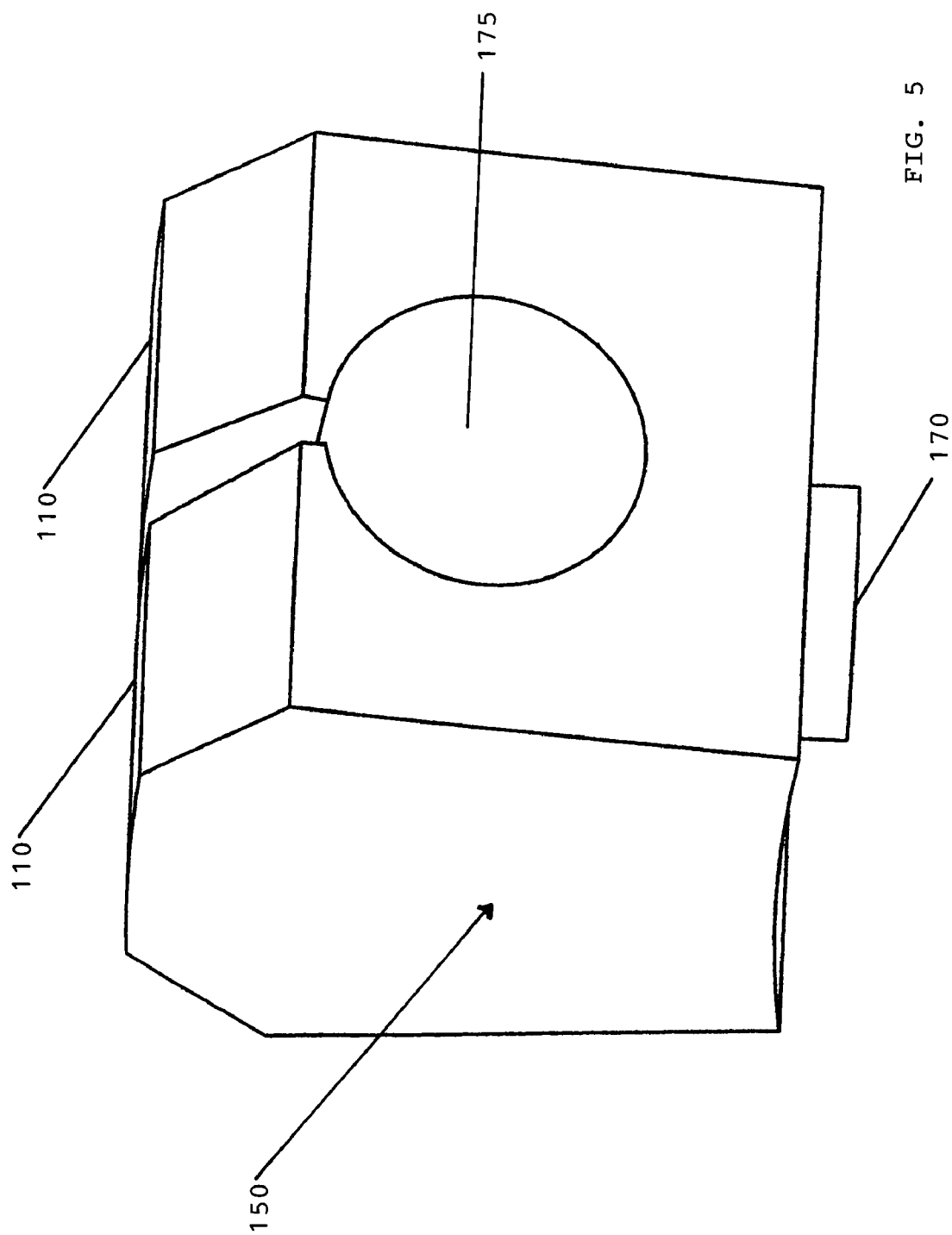

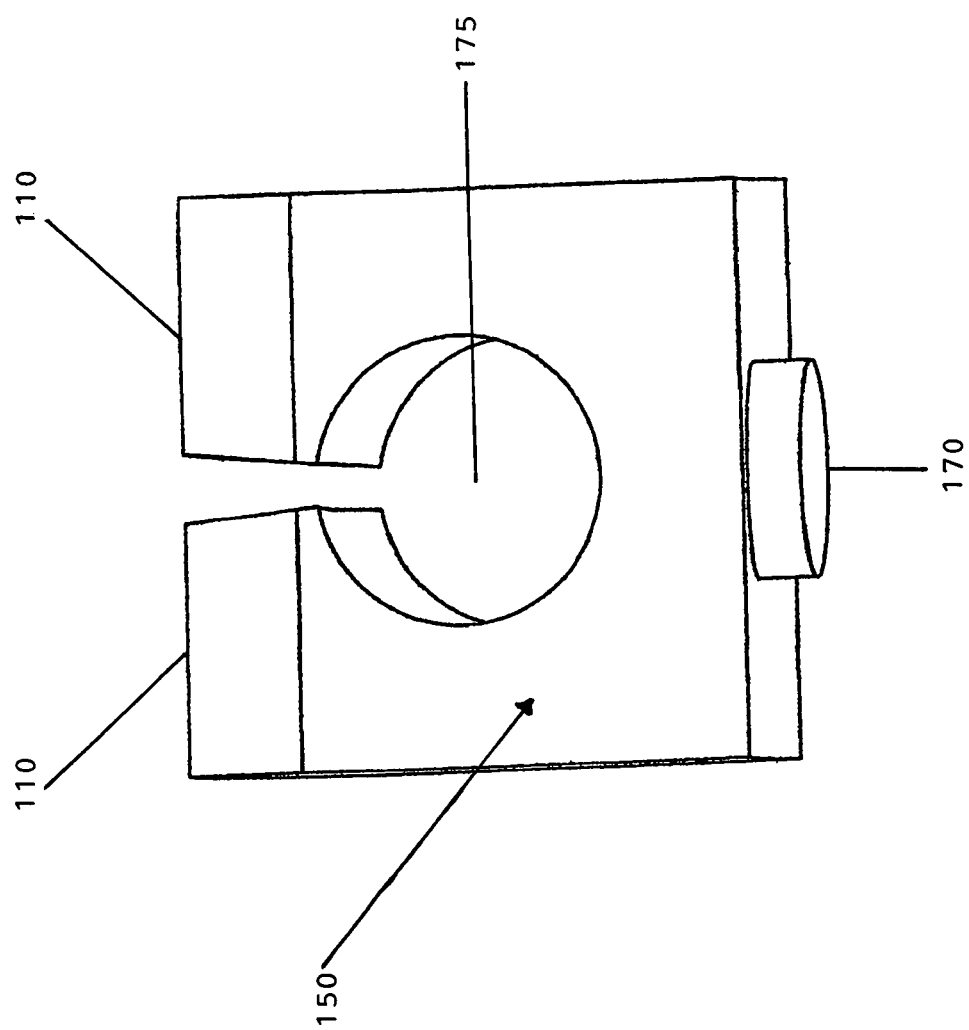

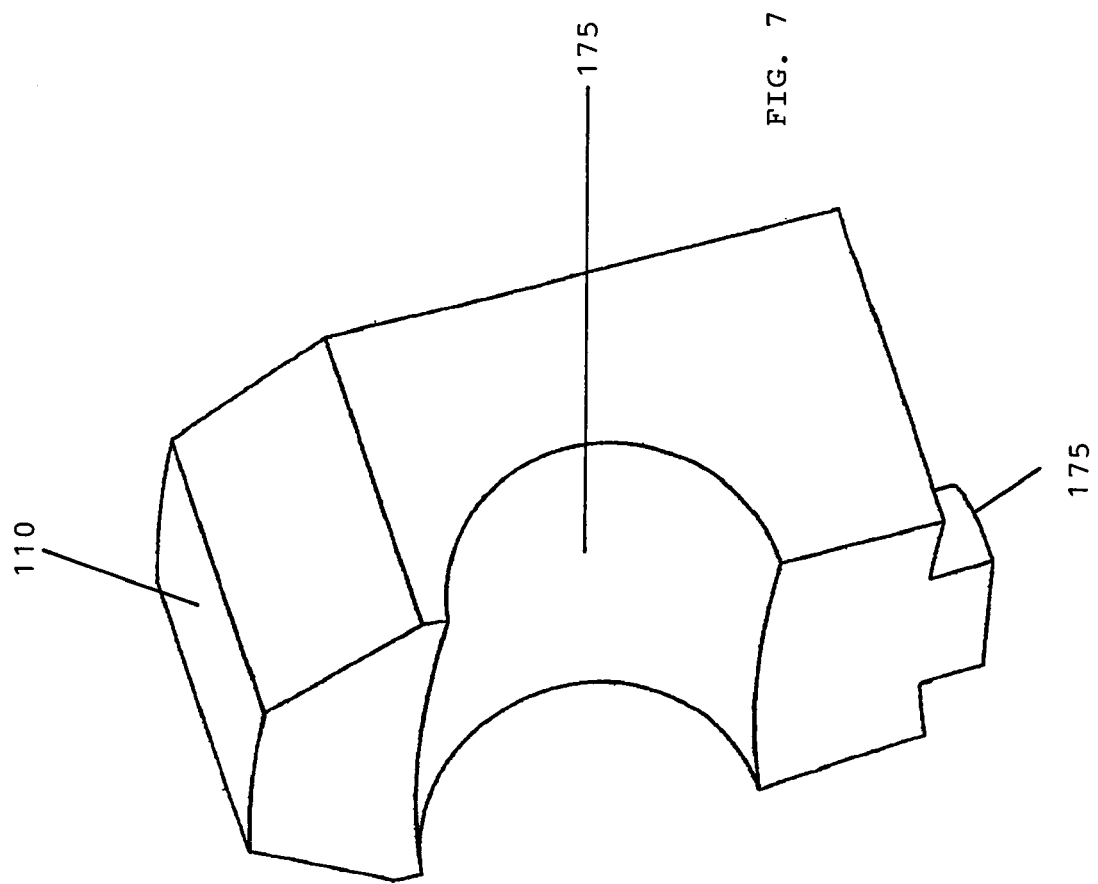

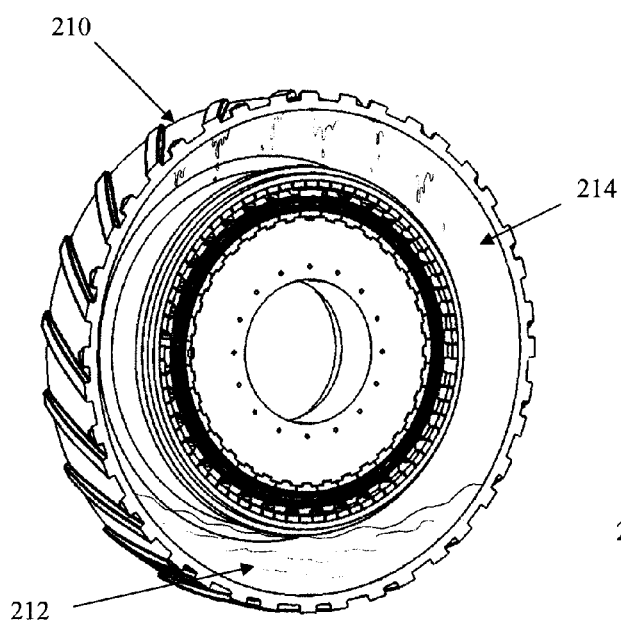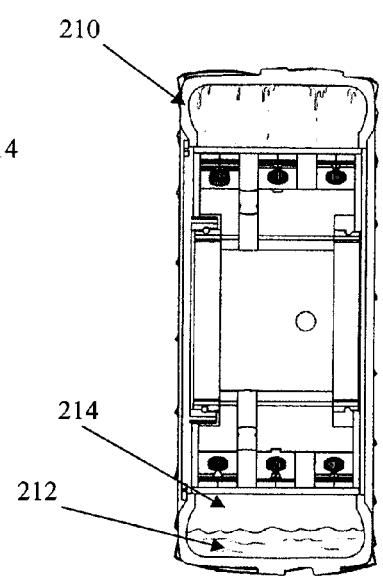
FIG. 8B
FIG. 8C

HIGH-EFFICIENCY WHEEL-MOTOR UTILIZING MOLDED MAGNETIC FLUX CHANNELS WITH TRANSVERSE-FLUX STATOR

FIELD OF THE INVENTION

This invention relates to motors and, in particular, to methods, systems, apparatus and devices for a high efficiency direct drive high torque motor utilizing molded magnetic flux channels with transverse flux stator windings.

BACKGROUND AND PRIOR ART

Approximately 93% of motors constructed use iron cores, or variations thereof, to concentrate magnetic flux and boost torque. "Coreless" motors are suited for very high RPM's with low torque and iron core motors usually utilize insulated steel laminations in their stators which reduce heat losses from eddy currents. However, even with thinner laminations, the eddy currents are only blocked in one plane. So to further reduce eddy current losses, silicon is typically added to the steel to reduce its electrical conductivity. Although the silicon reduces some remaining eddy current losses (by reducing the current conductivity), the addition of silicon actually worsens the magnetic conductivity. This reduction of magnetic strength reduces the maximum amount of torque produced, and also reduces electrical efficiency.

Most prior art multi-phase motors use phase windings radially sequenced around the plane of rotation. The close coupled proximity results in "Armature Effect" which reduces efficiency at higher speeds. The usual multi-phase high speed motors also require a gearbox or other loss prone speed reducing device in order to boost torque. Additionally, conventional motors use some variation of axial or radial flux, with multiple salient windings wound around iron type cores. Although this boosts magnetic flux, it also increases inductance and electrical resistance, and reactance. At higher speeds, the inductive and reactive losses limit top speed and efficiency at high speed.

Known prior art direct drive motors include U.S. Pat. No. 4,625,392 issued to Stokes on Dec. 2, 1986 titled Method of manufacturing a molded rotatable assembly for dynamoelectric machines describes molding a rotor of a motor from magnetic material. However, it does not involve Transverse Flux and does not use molded material for the stator.

U.S. Pat. No. 4,853,567 titled Direct Drive Motor issued on Aug. 1, 1989, which describes a three phase outer rotor motor. However, it uses conventional configuration with the three phase windings sequentially located within the same axis, and does not use Transverse Flux.

U.S. Pat. No. 5,777,413 issued to Lange et al. on Jul. 7, 1999 titled Transverse flux motor with magnetic floor gap describes a locomotive motor with Transverse Flux. However, it uses conventional iron laminations as its flux path, and is mainly concerned with physically flattening the motor to allow it to fit into the space between the floor of the locomotive and the train axle.

Prior art transverse Flux motors have historically been too costly to construct, and have rarely been used. This invention simplifies construction and lowers costs of Transverse Flux motors, and at the same time increases electrical efficiency to a higher level than before.

The motor of the present invention overcomes a problem with prior art motors by using separate, independent, uncoupled planes for each phase, and phase and pulse timing to eliminate the "Armature Effect" which results is much higher efficiency at higher speed. The novel motor also has very high torque and can drive directly most loads (such as vehicle tracks, wheels, or propellers) without requiring clutches, gearboxes, or other speed reducing devices. The result is greater efficiency, lower costs, and fewer moving parts.

The present invention also overcomes prior problems associated with boosting magnetic flux, which increases inductance and resistance and at higher speeds, the inductive losses limit top speed and efficiency at high speed. The direct drive motor of the present invention can use radial flux construction, but the preferred embodiment is Transverse Flux construction. In Transverse Flux construction, one large single winding powers each phase. Because magnetic flux is directly proportional to Ampere-Turns, the same magnetic flux can be achieved with more turns with less amperage, or higher amperage and fewer turns. In the preferred embodiment, this novel motor has fewer turns, and higher amperages. With fewer turns, the inductance is less, and with larger copper conductors the electrical resistance is less also. Since the inductance and resistance are reduced, both the inductive losses and the resistive losses are greatly reduced which results in higher efficiency and also a much higher speed usable range.

SUMMARY OF THE INVENTION

A primary objective of the invention is to provide apparatus, methods, systems and devices for a very high efficiency direct drive high torque motor utilizing Molded Magnetic Flux Channels with Transverse Stator Windings.

A secondary objective of the invention is to provide apparatus, methods, systems and devices for a high efficiency direct drive high torque motor constructed using Molded Magnetic Flux Channels which increases the overall efficiency by greatly reducing eddy currents in all planes.

A third objective of the invention is to provide new apparatus, methods, systems and devices for a high efficiency direct drive high torque motor using Molded Flux Channels to reduce cost, and make possible more magnetically efficient shapes which results in higher overall efficiency.

A forth objective of the invention is to provide new apparatus, methods, systems and devices for a high efficiency direct drive high torque motor that uses radial flux construction, but the preferred embodiment is Transverse Flux construction. In Transverse Flux construction, one large single winding powers each phase. This reduces the complexity and losses typically encountered with multiple salient type windings.

A fifth objective of the invention is to provide new apparatus methods, systems and devices for a high efficiency direct drive high torque motor with fewer turns, and higher amperages. With fewer turns, the inductance is less, and with larger copper windings the electrical resistance is less also. Since the inductance and resistance can be much less, both the inductive losses and the resistive losses are greatly reduced. The result is higher efficiency and also a much higher speed usable range.

A sixth objective of the invention is to provide new apparatus, methods, systems and devices for a Transverse Flux motors having a simplified construction and lowers costs, and at the same time increases electrical efficiency to a higher level than the prior art.

A seventh objective of the invention is to provide new apparatus, methods, systems and devices for a Transverse Flux motors that does not have external magnetic fields and produces negligible radio-frequency RF noise.

An eighth objective of the invention is to provide new apparatus, methods, systems and devices for a Transverse Flux motors for use as a wheel motor. A tubeless tire can be mounted on the rotor drum and the tubeless tire can be partially filled with a liquid coolant which then cools to rotor drum and attached permanent magnets.

A ninth objective of the invention is to provide new apparatus methods, systems and devices for a Transverse Flux motors having a sufficient torque to directly power track wheels, wheel motors or marine propellers.

A tenth objective of the invention is to provide new apparatus methods, systems and devices for a Transverse Flux motors for use as a high efficiency motor, high efficiency generator or a dynamo. The motor may also be used as a synchronous motor.

The present invention overcomes the problems with the prior art and provides a motor that achieves high efficiency (98% demonstrated) and has the following advantages:

1. Near Elimination of eddy current loses in stator.

2. Greatly reduced hysterisis losses in stator.

3. Significant reduction of conductor resistive (IR) losses.

4. Reduction of inductive losses.

5. Elimination of phase "armature effect" losses.

6. Elimination of previously required mechanical or hydraulic power transmission losses, previously necessary to achieve high torque with low RPM.

7. Reduced complexity and lowered cost of construction of Transverse Flux Motors.

A first preferred embodiment of the invention provides a motor comprising a mounting shaft having a hollow channel and a bearing attached to each end of the mounting shaft, a non-rotating cylindrical hub having a hollow core for the mounting shaft, plural rows of plural molded magnetic flux channels having a hollow core and a channel from the upper surface to the hollow core forming a U-shaped recess, the plural molded magnetic flux channels fixedly attached on a cylindrical surface of the cylindrical hub, each one of the plural rows corresponding to a phase of the motor, wherein each one of the plural magnetic flux channels forms two pole pieces divided by the channel, plural phase windings, one of the plural transverse windings passing through one of the rows of plural magnetic flux channels and corresponding to one phase, a rotating drum having plural paired rows of plural permanent magnets on an inner surface, each paired row corresponding to and aligned with one of the plural rows of molded magnetic flux channels, the rotating drum connected with the bearing to allow the plural rows of permanent magnets to rotate around the cylindrical hub, and drive electronics for driving the plural phase windings with variable timing advance and current pulse shaping, wherein the plural molded magnetic flux channels capture nearly all the available flux which increases torque and motor efficiency.

Further objects and advantages of this invention will be apparent from the following detailed description of preferred embodiments which are illustrated schematically in the accompanying drawings.

BRIEF DESCRIPTION OF THE FIGURES

FIG. 3 is a cross sectional perspective side view of an example of a single phase assembly showing multiple Molded Flux Channels mounted to a fiberglass hub.

FIG. 4 is a cross sectional perspective side view (cut in half) of the same example- the single phase assembly showing the Molded Magnetic Flux Channels, the fiberglass hub and the single phase copper winding.

FIG. 5 is a perspective view of a Molded Magnetic Flux Channel showing the copper winding tunnel, the two pole pieces and the locating pin.

FIG. 6 is another perspective view of the molded flux channel of FIG. 5 from a different angle.

FIG. 7 is a cross sectional perspective view of a single Molded Flux Channel (cut in half) showing the curved internal tunnel for the copper windings which supplies the Transverse Flux.

FIG. 8b shows a cross sectional front view showing a part liquid and part gas in an area between the outer surface of the rotating drum and an inner surface of the tubeless tire.

FIG. 8c shows a cross sectional side view showing a part liquid and part gas in an area between the outer surface of the rotating drum and an inner surface of the tubeless tire.

DESCRIPTION OF THE PREFERRED EMBODIMENTS

Figure 1A:
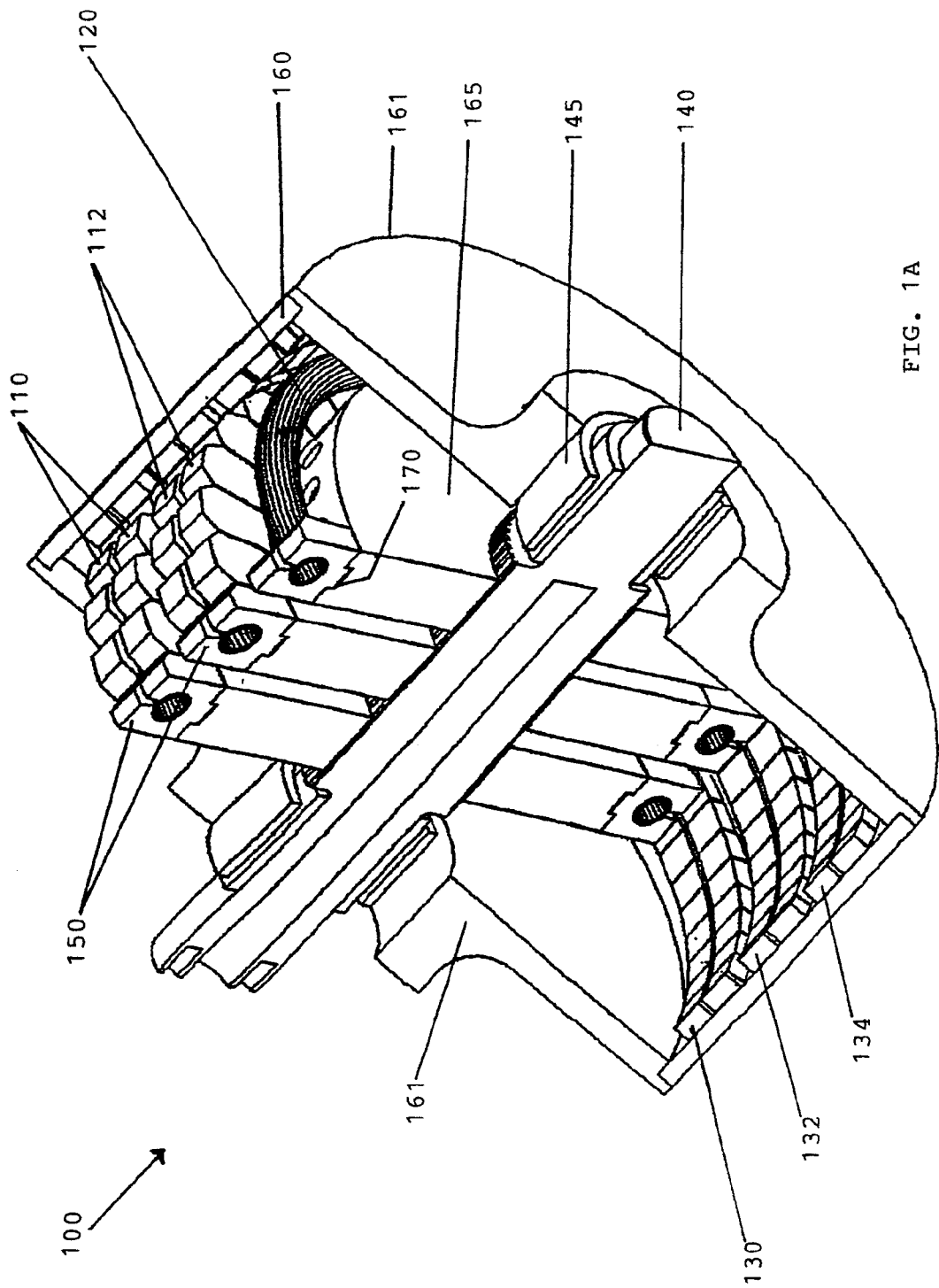
FIG. 1a is a cross sectional perspective drawing of a motor having three phases according to the present invention.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

The following is a list of the reference numbers used in the drawings and the detailed specification to identify components:

| | |
|---|---|
| 100 | motor |
| 110 | pole pieces, phase "A" |
| 112 | pole pieces, phase "B" |
| 114 | pole pieces, phase "C" |
| 120 | transverse copper wire winding |
| 130 | row of magnets, Phase "A" |
| 132 | row of magnets, Phase "B" |
| 134 | row of magnets, Phase "C" |
| 136 | epoxy |
| 140 | mounting shaft |
| 142 | colant lines |
| 145 | bearing |
| 150 | Magnetic Flux Channels |
| 160 | rotating drum |
| 161 | rotating side plate |
| 162 | mounting shaft hole |
| 165 | hub |
| 170 | locating key |
| 175 | hollow core |
| 200 | wheel motor |
| 210 | tire |
| 212 | liquid |
| 214 | gas |

The method, system, apparatus and device of the present invention provides a high efficiency direct drive high torque motor utilizing Molded Magnetic Flux Channels with transverse windings. According to the present invention, the motor can be either stator outside or rotor outside and the motor utilizes separate multiple phase windings. In a preferred embodiment, the motor includes at least three phases. FIG. 1a is a cross sectional perspective view of a direct drive high torque motor having motor having three phases. As shown the direct drive motor 100 includes three phases A, B and C each having plural Molded Magnetic Flux Channels that form plural pairs of pole pieces 110, 112 and 114 with a copper winding 120A, 120B and 120C and a corresponding pair of magnetic rings 130, 132 and 134 corresponding to each phase A, B and C that are fixedly attached on a rotating drum 135.

The Molded Magnetic Flux Channels replace conventional laminated silicon steel as the flux concentrating device. The Molded Magnetic Flux Channels, in combination with the improved magnetic shapes captures and delivers more available flux to the pole pieces. Additionally, the high precision molded part lowers construction cost of transverse flux machines.

Figure 1B:
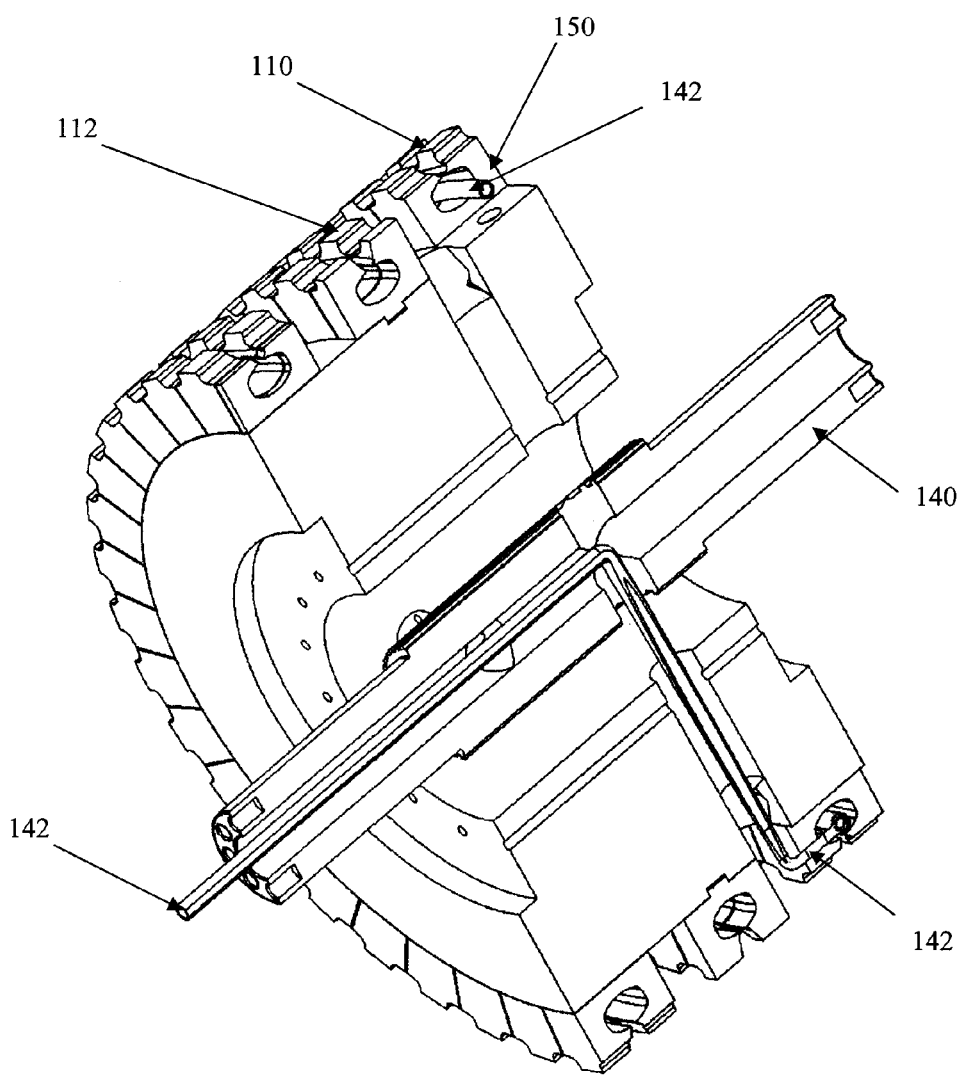
FIG. 1b is a cross sectional perspective drawing of a motor having three phases showing a cooling non metallic hollow tube wound through one of the plural rows of plural magnetic molded flux channels.

The pole pieces 110, 112 and 114 are fixedly attached to a hub attached to center non rotating mounting shaft 140 having bearings 145 around each end of the non-rotating mounting shaft 140. Each phase corresponds to two rows of pole pieces and two rows of permanent magnets. Permanent magnets are placed in twin rows (two rows for each phase). For example, phase A includes left and right pole pieces 110 which are coupled with two rows of magnets 130 that are mounted on the interior surface of rotating drum 160. The non-rotating mounting shaft 140 may be hollow for routing power cables, signal cables, or both. In an alternative embodiment, the hollow non-rotating mounting shaft 140 also includes coolant lines 142. FIG. 1b shows a cooling non metallic hollow tube 142 wound through one of the plural rows 110 of plural magnetic molded flux channels 150 and through the hollow channel of the mounting shaft 140 for cooling the motor. For clarity, only one phase is shown with a cooling tube although each phase can include a coolant tube 142.

Figure 2A:
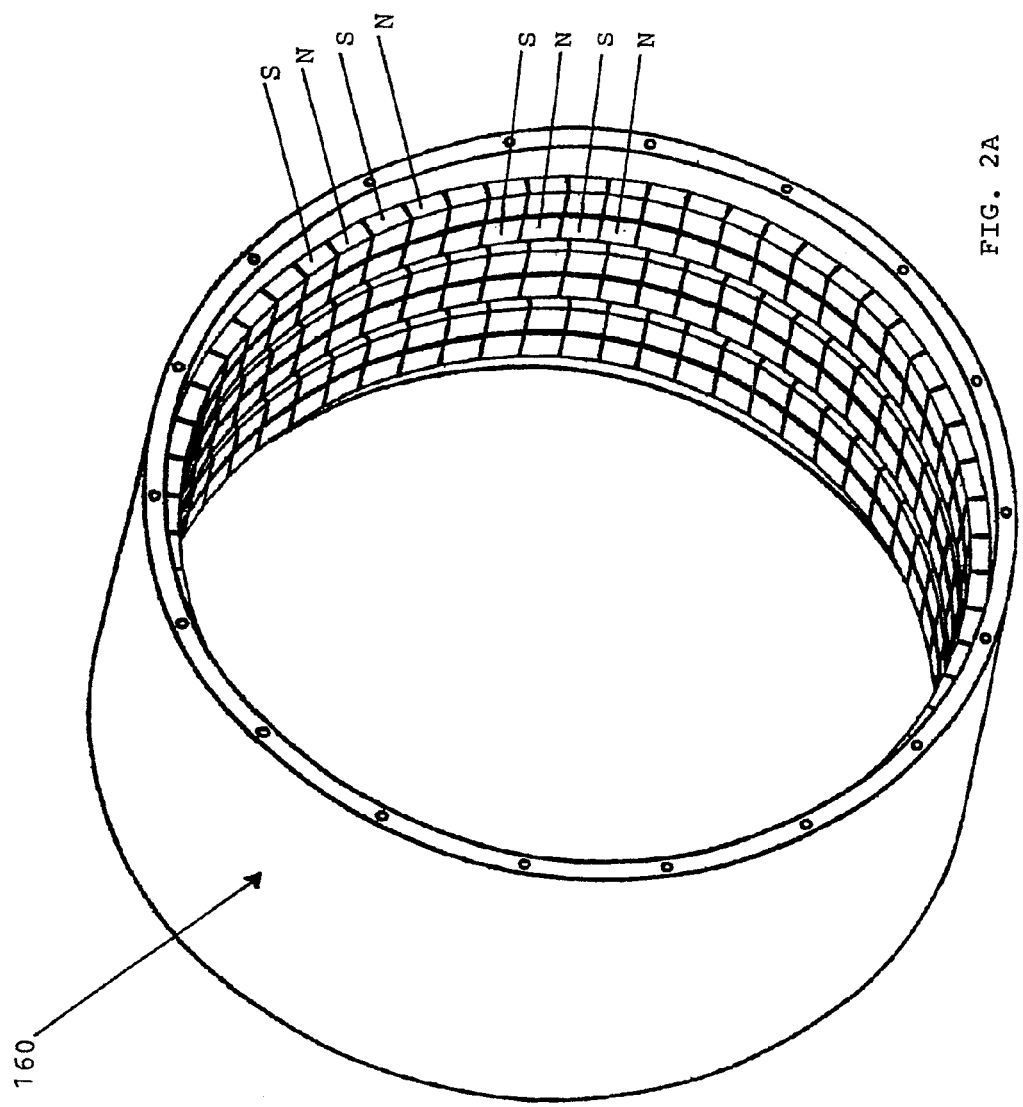
FIG. 2a is a perspective side view of the outer rotor shell, showing two rows of magnets for each phase.
Figure 2B:
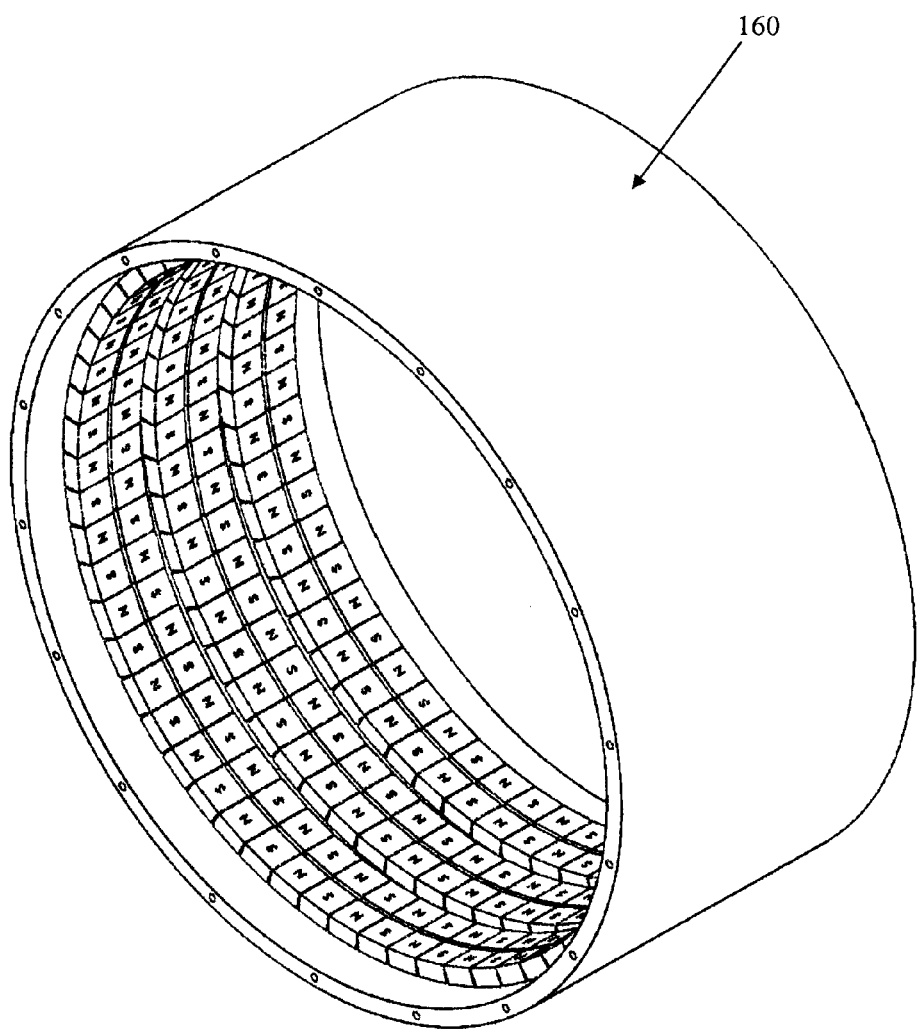
FIG. 2b is a perspective view of an example of the interior surface of the rotating drum.
Figure 2C:
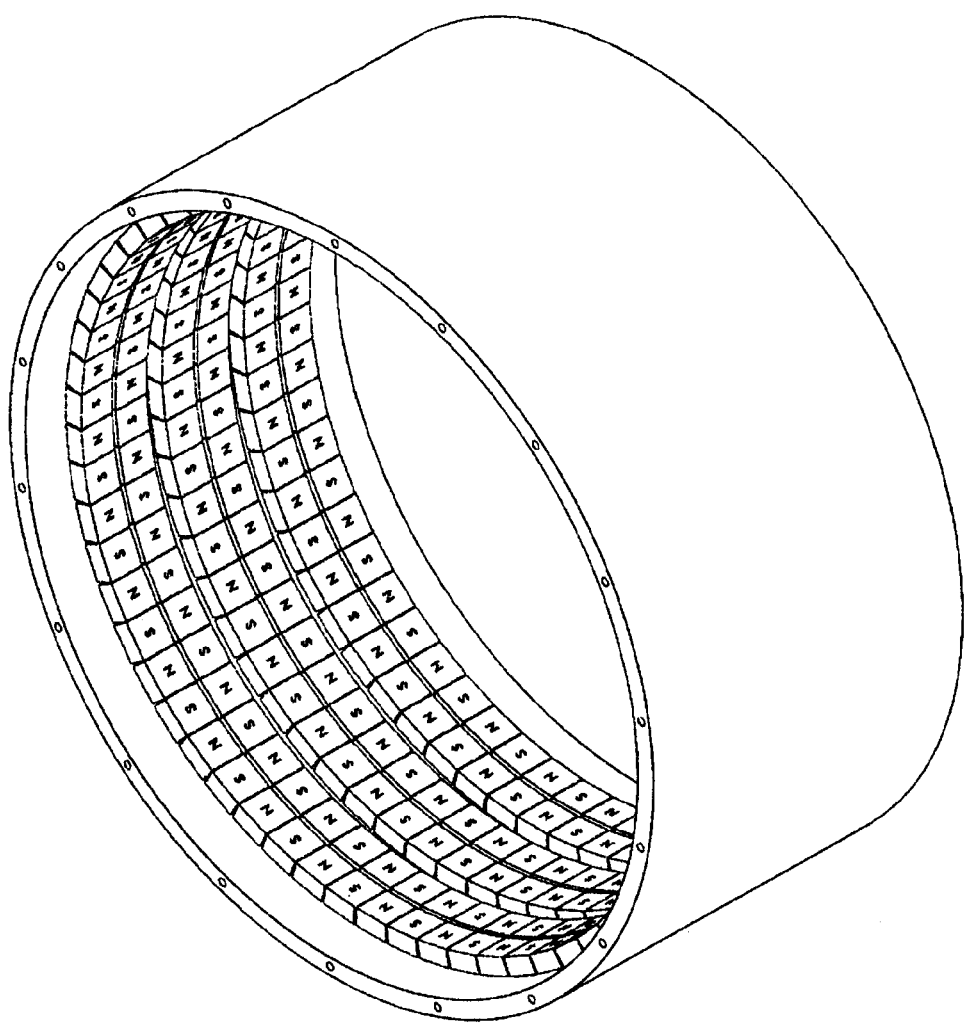
FIG. 2c is a perspective view of another example of the interior surface of the rotating drum.

FIGS. 2a, 2b and 2c show perspective views of examples of the interior surface of the rotating drum 160. As shown, each phase includes two rows of permanent magnets and each row includes plural adjacent permanent magnets, each having a south pole and a north pole. Adjacent magnets in each row alternate. Adjacent magnets in paired rows alternate in magnetic polarity. For example, the north pole of one magnet is adjacent to the south pole of the adjacent magnets as shown in FIGS. 2a, 2b and 2c. The drum to which the magnetic are attached is the main moving part which increases the reliability of the motor. In an embodiment, the motor is sealed from external elements. With appropriate seals, the motor can be used underwater.

Figure 9A:
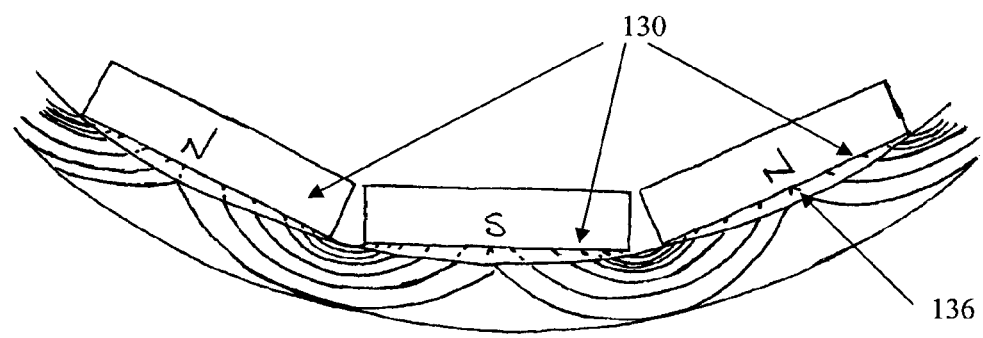
FIG. 9a shows an example of the magnetic air gap between the magnet and the curved surface of the drum is filled with epoxy attaching the plural flat permanent magnets to the rotating drum to reduce the magnetic air gap between the plural permanent magnets and the inner surface of the rotating drum.
Figure 9B:
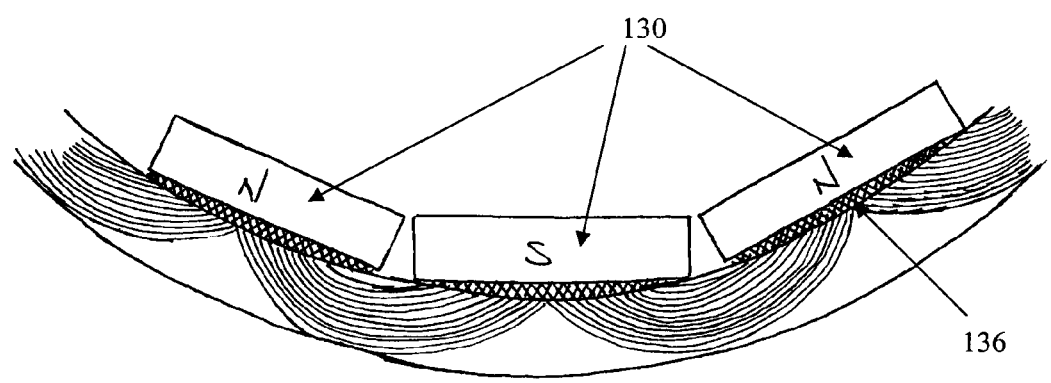
FIG. 9b shows another example of the flat magnet back bonded with epoxy containing powdered iron to reduce the magnetic air gap between the plural permanent magnets and the inner surface of the rotating drum.

Preferred empowerment of rotor outside construction allows permanent magnets 130 to be bonded with special epoxy 136 containing powdered iron as shown in FIGS. 9a and 9b to reduce the magnetic air gap between the outer surface of the permanent magnets 130 and the inner surface of the outer steel housing to permit more economical construction by allowing the use of flat magnets rather than requiring the more expensive radially curved magnets. The two rows of permanent magnets for each phase enhances the transverse flux design by eliminating the complexity of the return flux circuit elements required in prior art systems, which improves torque, efficiency and reduces demagnetizing fluxes.

The motor uses any even high number of poles, eight or more, and in a preferred embodiment, the motor includes between 32 and 72 or more poles. Increasing the number of poles result in higher torque at lower speeds. In the preferred embodiment, two or more phases may be used with each phase having a separate radial circle of Molded Flux Channels and its energizing coil. Typically, three or more phases may be used, with higher numbers giving increased running torque and less cogging torque.

Higher efficiency of the motor is achieved by physically separating each phase winding, Molded Flux Channels and poles, and permanent magnets. FIG. 3 is a perspective side view of the molded magnetic flux channels 160 attached to a hub 165. In a preferred embodiment the hub is fiberglass although alternative non-magnetic, non-conductive materials may be substituted. As shown, there are plural Molded Magnetic Flux Channels 160 around the outer edge of the fiberglass hub 165 with a shaft mounting hole 162 in the center. Fabrication of the non rotating hub with non conductive, non magnetic material eliminates eddy currently in the hub and reduces the weight of the of the motor. In one embodiment, the non rotating hub 165 includes one disc for each phase, alternatively, the molded magnetic flux channels for all of the phases are mounted on one larger non-magnetic, non conductive cylinder.

FIG. 4 is a cross sectional perspective view of FIG. 3 (cut in half) showing the transverse copper winding 120 located inside the Molded Magnetic Flux Channels 150 that are attached to the hub 165. As shown, the molded magnetic flux channels contain a curved tunnel for housing the transverse flux producing coil winding. Losses due to interconnection splices between individual stator coils are eliminated due to the elimination of multiple coils per phase. Each phase coil can have a minimum of two terminals or a larger number for voltage taps or series/parallel connection. In an alternative embodiment, the Molded Magnetic Flux Channels also include non conductive coolant lines or hollow coils for direct circulation of coolant.

Typical IR losses are greatly reduced by replacing multiple conventional salient windings used in prior art motors with one continuous coil of large diameter wire. Typical inductive losses are also reduced by using one coil winding per phase winding. The configuration of the present invention practically eliminates stray flux lines by substantially surrounding the phase coil winding 120 with Molded Magnetic Flux Channels 150, which conduct the captured flux directly to the individual molded pole pieces. The motor of the present invention has higher efficiency and higher torque than conventional salient wound radial flux or axial flux designs, and full torque is available from a dead stop to a high range of RPM. Additionally, connection costs and losses between conventional multiple salient wound designs are eliminated by eliminating the connections altogether. Coil winding costs are also reduced.

Figure 11A:
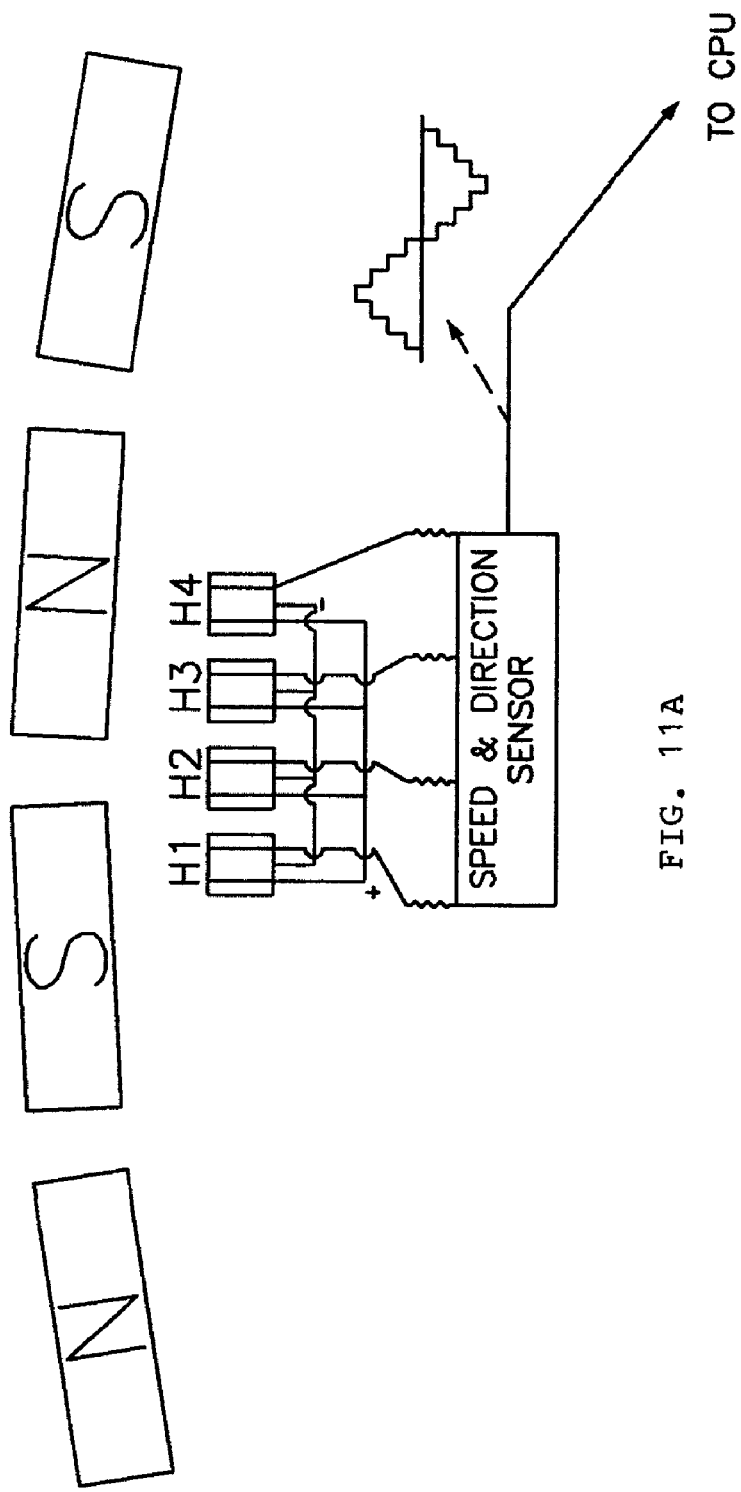
FIG. 11a is a schematic showing the timing, direction and speed magnetic flux detector.
Figure 11B:
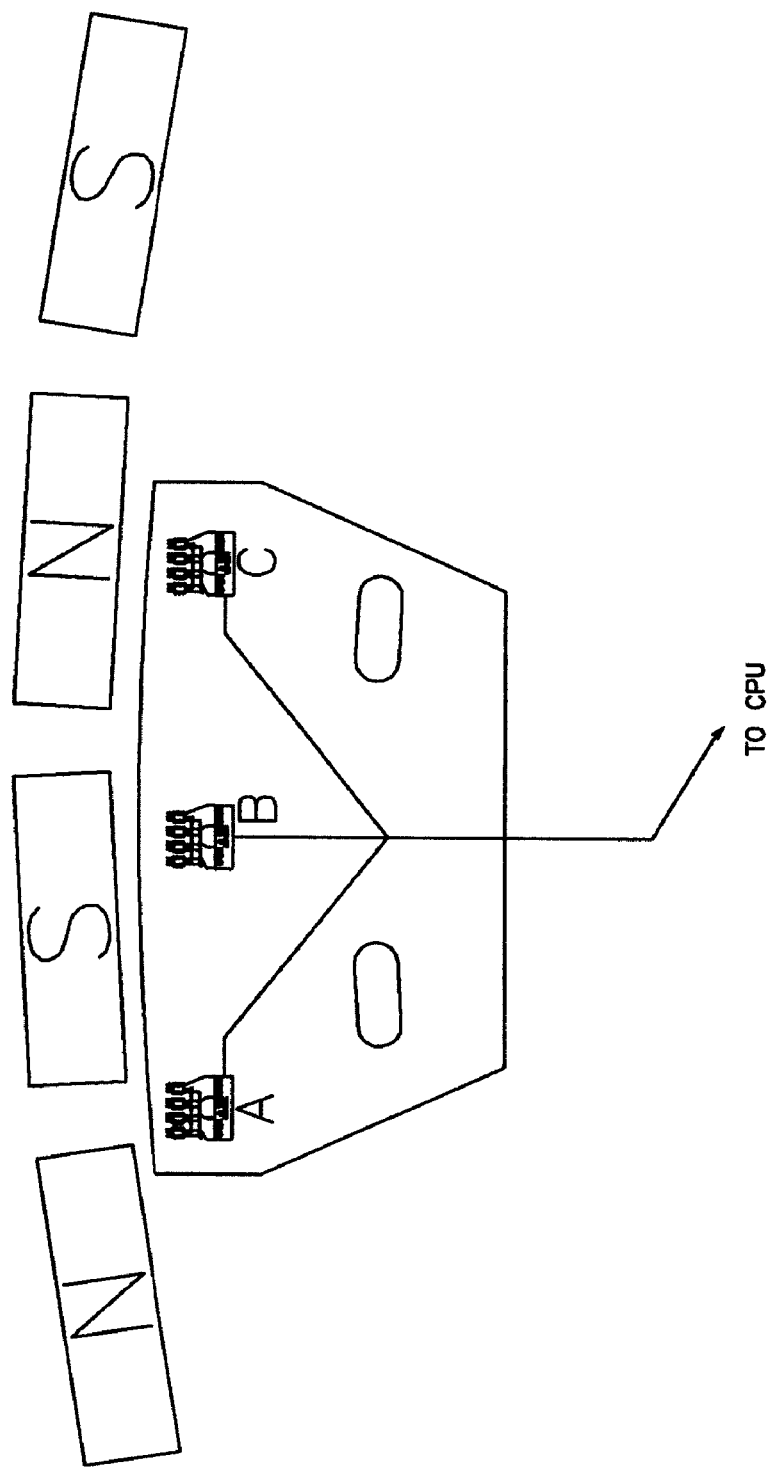
FIG. 11b is a schematic showing the three-phase embodiment with 120 degree spacing between modules and shows the timing, direction and speed magnetic flux detectors.

In a three phase version of the present invention, either the stators may be offset 120 electrical degrees with the magnet aligned or the motor magnets may be offset 120 electrical degrees with the stators aligned. FIG. 11b is a schematic showing the three-phase embodiment with 120 degree spacing between modules and shows the timing, direction and speed magnetic flux detectors. Mechanically, the offset depends on the number of poles per the following formula.

Offset=number of pole pairs/360×number of phases.

Thus for a 60 pole motor with three phases:

Offset=360/30=12 degrees divided by 3=4 degrees

FIGS. 2b and 2c show examples of the permanent magnetic arrangement with different offsets.

FIG. 4 is a cross sectional perspective side view of the single phase assembly showing a ring of pole pieces 110 formed from one half of a Molded Magnetic Flux Channel 150, fiberglass hub 165 and the single phase copper winding 120 supplying the Transverse Flux. This configuration includes locating keys 170 corresponding to each adjacent Molded Magnetic Flux Channel. The locating keys 170 allow precision placement of the plural molded magnetic flux channels. Hysteresis losses in the stator are greatly reduced by elimination of typical laminated silicon iron, and construction of the Molded Magnetic Flux Channels 150 of high permeability, high flux density conducting hard or soft ferrite materials, sintered iron-nickel alloy, amorphous alloys or similar molded products.

These Molded Magnetic Flux Channels may be constructed of materials such as ferrite, iron-nickel sintered alloy or can be fabricated with imbedded insulated iron wire bundles. Since the Molded Magnetic Flux Channels are electrically non-conductive of electrical current, eddy currents are virtually non-existent. The high permeability, low conductivity Molded Magnetic Flux Channels increase torque and increase efficiency.

The preferred embodiment of the present invention eliminates eddy current and hysteresis losses in the stator hub by constructing the hub of non conductive, non metallic material such as fiberglass and completely eliminating bolts, clamps, nuts, clips, and other metal parts. The preferred embodiment of the stator also substantially eliminates core losses caused by eddy current, by eliminating conventional laminations and conventional pole pieces to carry the magnet lines of force. Another advantage of using the Molded Magnetic Flux Channels is reduction of eddy current heating losses.

Exploded perspective views of a Molded Magnetic Flux Channel 150 that forms a pair of pole pieces 110 are shown in FIGS. 5 and 6. As shown, each magnetic flux channel 150 is molded to have a hollow core 175 for the transverse copper winding 120 and includes a locating key 170 on the bottom of the magnetic flux channel 150 for mounting plural magnetic flux channel 150 on the fiberglass hub 165. FIG. 7 is a cross sectional perspective view of one pole piece 110 shown in FIGS. 5 and 6.

Using the configuration of the present invention overcomes the problem of "Armature Reaction", by reducing the Flux shift due to interaction of permanent magnets and flux of stator which is a problem in prior art motors. Another advantage of using this configuration is that there is no inter-reaction between phases as on conventional circuitry using sequenced stators and rotors. This allows near perfect timing of stator current to coincide with natural reverse EMF of stator by the simpler and more precise method of timing phase advance and current pulse wave form shaping and duration variation.

Figure 10A:
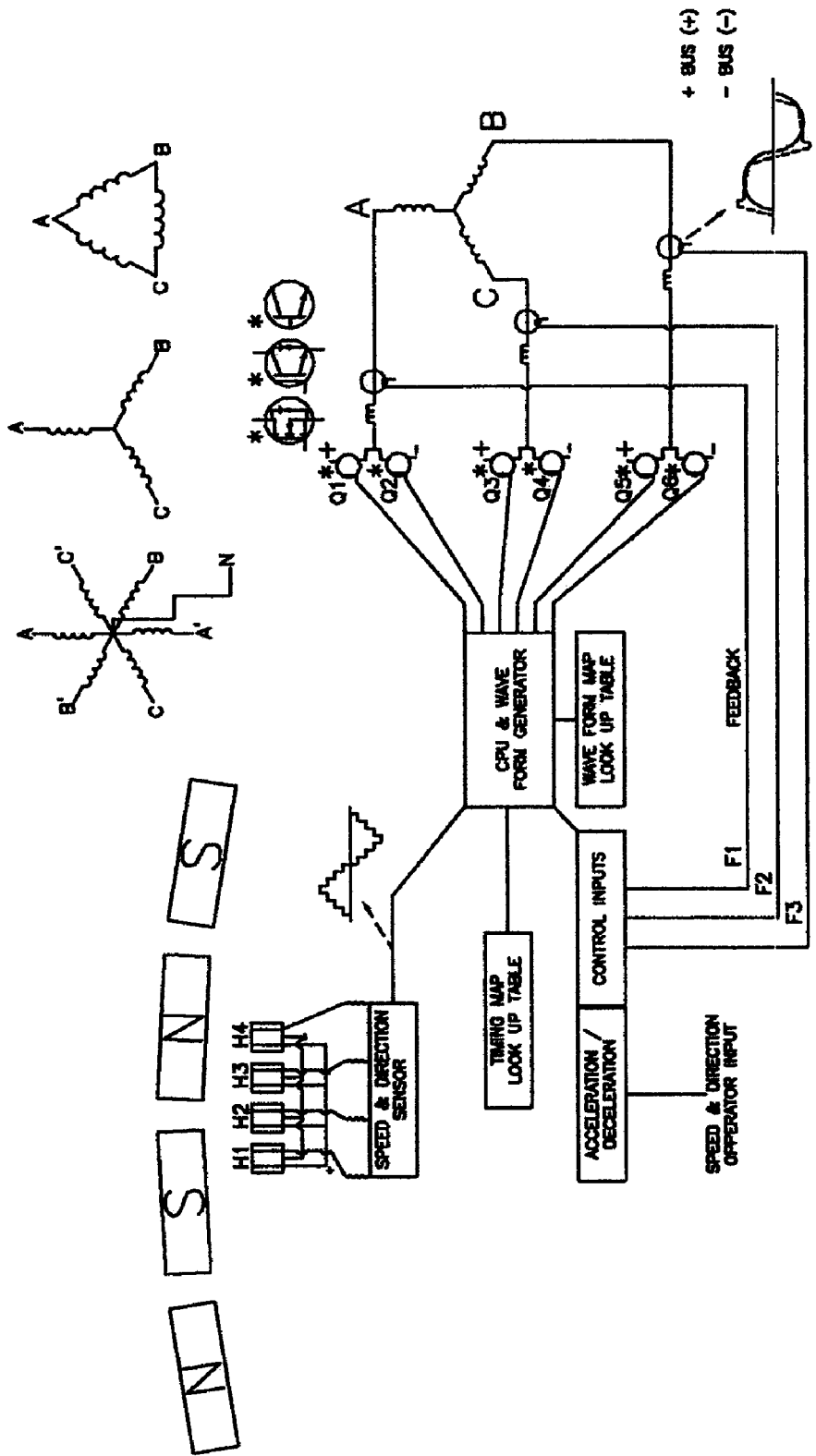
FIG. 10a shows an example of a WYE, STAR, or DELTA connection and a schematic diagram of a circuit using a WYE configured stator.
Figure 10B:
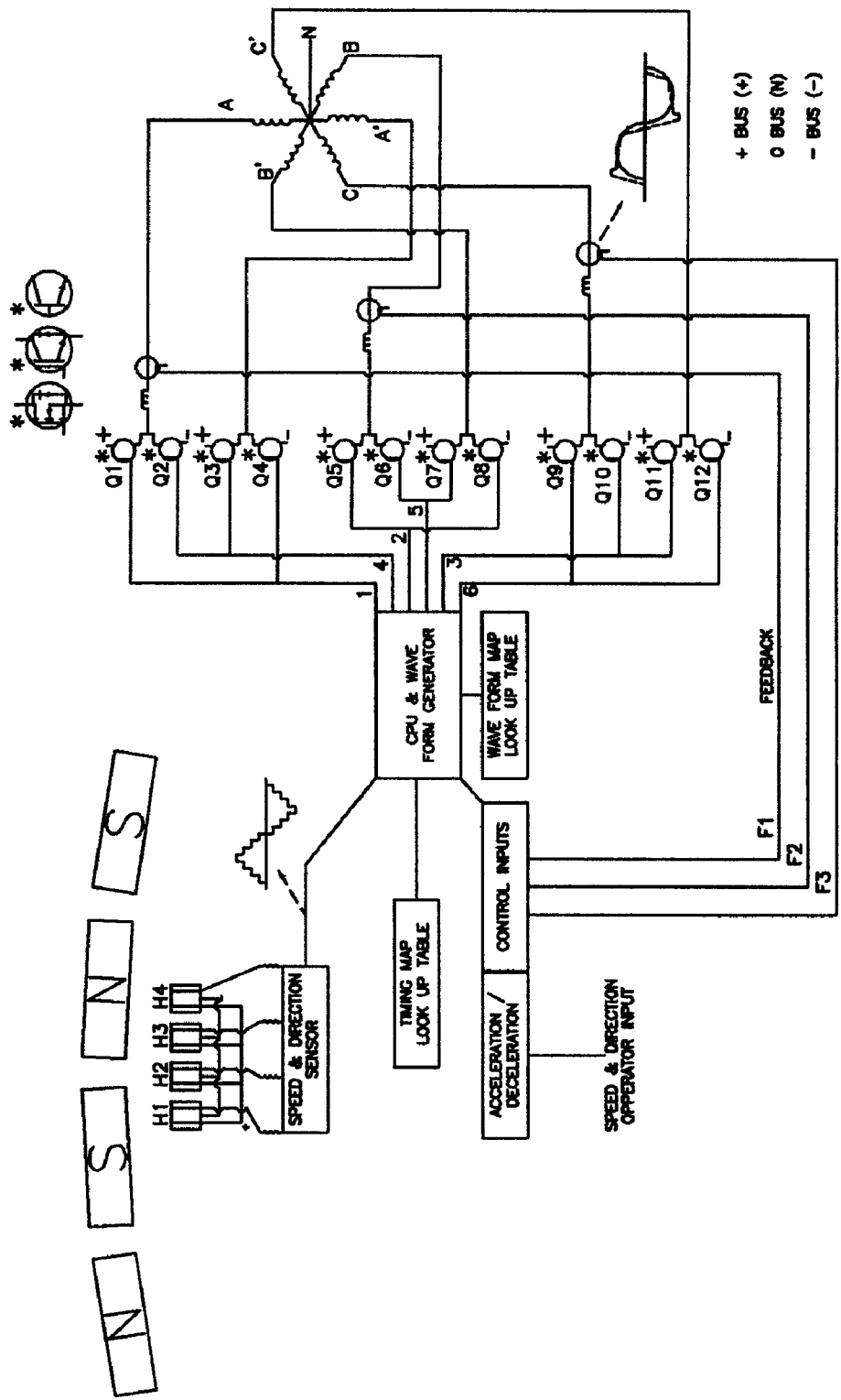
FIG. 10b is a schematic diagram of an example of a circuit using a STAR configured stator.

Phase windings may be individually driven by electronics, or may be WYE, STAR, or DELTA connected as shown in FIG. 10a. The A, B and C windings are connected to the same electrical circuit foe each of the WYE and DELTA configurations although FIG. 10a shows a schematic diagram of a circuit using a WYE configuration. FIG. 10b is a schematic diagram of an example of a circuit using a STAR configured stator. In FIGS. 10a and 10b also show drive electronics for driving the plural phase windings including timing, direction and speed magnetic flux detectors. FIG. 11a also shows the timing, direction and speed magnetic flux detector. In a preferred embodiment, each phase stator winding is separately driven by a square wave output from a motor full bridge power circuit, not shown. Unlike prior art motors, it is not necessary to use six step trapezoidal power to run the motor although this type excitation can be used. Alternatively, a sine wave AC may be used to drive the motor. During high torque starting, DC may be applied to all phase coils simultaneously, except for the one phase while the passing magnet polarity reverses.

In an embodiment, a cooling, non-metallic hollow tube may be wound in the rows of Molded Magnetic Flux Channels to carry away the IR heat generated by the coil windings. In very large motors, hollow coil conductors may be used for the same purpose, with liquid coolant circulated through the coils.

Figure 8A:
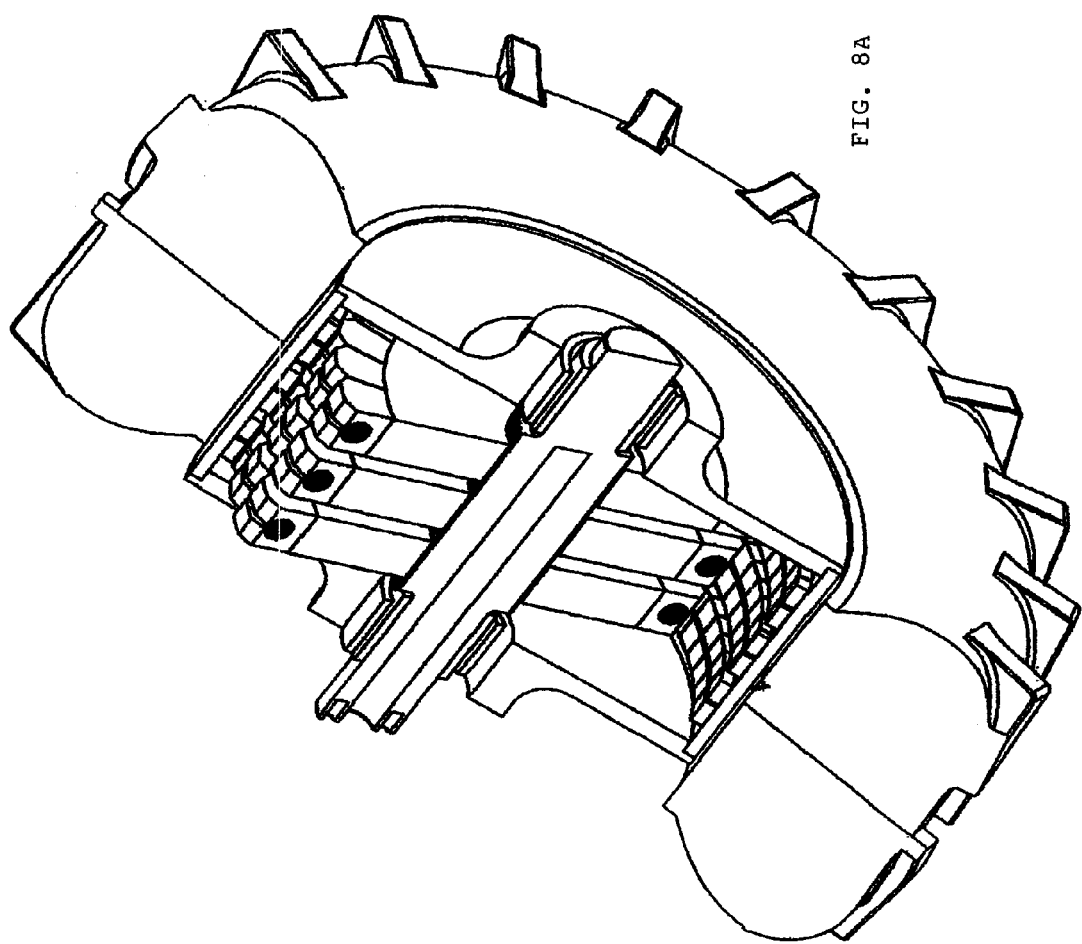
FIG. 8a is a cross sectional perspective view of a wheel motor according to an embodiment of the present invention.

A preferred embodiment is the "Wheel Motor" 200 shown in FIGS. 8a, 8b and 8c. FIGS. 8b and 8c show a cross sectional front and side view, respectively, showing a part liquid 212 and part gas 214 in an area between the outer surface of the rotating drum and an inner surface of the tubeless tire 210 for inflating the wheel tire, wherein rotation of the wheel motor causes the liquid to cool the neodymium magnets in the motor. In this embodiment, one or more large tubeless tires 210 are mounted on the circumference of the outer rotor, and the tire 210 is inflated with part liquid 212 along with gas 214 inflation. Rotation of the wheel motor 100 causes the liquid 212 to cool the rotor of the motor and the permanent magnets. This allows the use of lower cost neodymium magnets rather than the more costly samarium cobalt magnets. It is well known that neodymium magnets must not be allowed to get too hot or they may lose magnetism.

In alternative embodiments the motor is used for a track wheel or propeller hub motor. Other alternative embodiments include using the motor in any machine requiring high torque at low RPM without gearboxes, such as but not limited to, augers, elevator motors, and garage door motors.

In the preferred embodiment of the present invention, the motor 100 is a medium size motor with torque of approximately 20,000 ft. lbs. (88,000 NM) although the advantages apply to motors in the mega watt MW range and as small as approximately 5 watt.

The present invention overcomes the problems with the prior art and provides a motor that achieves high efficiency up to 98% has been demonstrated. The advantages of the novel motor includes near elimination of eddy current loses in stator; greatly reduced hysteresis losses in stator; significant reduction of conductor resistive (IR) losses; reduction of inductive losses; elimination of phase "armature effect" losses and previously required mechanical or hydraulic power transmission losses that were required by the prior art to achieve high torque with low RPM; and the motor of the present invention reduces complexity of the motor with a lower cost of construction of a Transverse Flux Motors.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A motor comprising:
    a non-rotating mounting shaft having a hollow channel and a bearing attached to each end of the mounting shaft;
    a cylindrical non-rotating hub having a hollow hole for the non rotating mounting shaft;
    plural rows of plural Molded Magnetic Flux Channels having a hollow core and a channel from the upper surface to the hollow core forming a U-shaped recess, the plural molded magnetic flux channels fixedly attached on a cylindrical surface of the cylindrical hub, each one of the plural rows corresponding to a phase of the motor, wherein each one of the plural magnetic flux channels forms two pole pieces divided by the channel;
    plural transverse phase windings, one of the plural transverse windings passing through one of the rows of plural magnetic flux channels and corresponding to one phase;
    a rotating drum having plural rows of plural permanent magnets on an inner surface, each row pair corresponding to and aligned with one of the plural rows of molded magnetic flux channels, the rotating drum connected with the bearing to allow the plural rows of permanent magnets to rotate around the cylindrical hub; and
    drive electronics for driving the plural phase windings, wherein the plural molded magnetic flux channels are timed to increase torque and motor efficiency.

2. The motor of claim 1, wherein the cylindrical hub comprises:
    plural adjacent disks forming the cylindrical hub, wherein each one of the plural adjacent disks corresponds to one phase of the motor, or all discs combined into one cylindrical hub.

3. The motor of claim 1, wherein each of the plural phase windings comprises:
    a transverse copper winding having at least two terminals, wherein the transverse flux copper winding are lower inductance and resistance for higher efficiency at high speeds.

4. The motor of claim 3, wherein the plural phase windings comprises:
    a first, second and third transverse copper winding, wherein use of one transverse copper winding per phase reduces inductive losses.

5. The motor of claim 1 wherein the Molded Magnetic Flux Channels are high magnetic permeability and low electrical conductivity material, with high saturation levels, which can be molded to a precise shape for improved magnetic performance, reduced cost, improved efficiency, and more available magnetic flux delivered to the pole pieces.

6. The motor of claim 5, wherein the high magnetic permeability and low electrical conductivity material is selected from a group consisting of:
    a hard ferrite material, soft ferrite material, iron-nickel sintered alloy, or an amorphous alloy to reduce hysteresis and eddy current losses.

7. The motor of claim 5, wherein the high permeability, low conductivity material includes:
    imbedded insulated iron wire bundles.

8. The motor of claim 1, wherein each row of the plural Molded Magnetic Flux Channels comprise:
    a non conductive coolant line for cooling the plural molded magnetic flux channels.

9. The motor of claim 4, wherein the hub is made from one material of a non-metallic fiberglass material and any material that is non-magnetic and non-conductive material without metal parts to eliminate eddy currents and hysteresis losses in the hub.

10. The motor of claim 1, wherein the drive electronics comprises:
    one of a Wye connection, Star connection or Delta connection for driving the motor, with phase timing current advance and pulse shape modification to improve efficiency and high speed operation.

11. The motor of claim 1, wherein each row of plural permanent magnets comprises:
    plural adjacent permanent magnets having alternating north and south poles to form two rows of alternating polarities for each phase to improve motor efficiency and reduce demagnetizing fluxes.

12. The motor of claim 11, wherein the plural adjacent permanent magnets comprise:
    plural flat permanent magnets; and
    an epoxy containing iron powder iron for attaching the plural flat permanent magnets to the rotating drum to reduce the magnetic air gap between the plural permanent magnets and the inner surface of the rotating drum.

13. The motor of claim 12, wherein each of the plural flat permanent magnets comprise:
    a neodymium magnet which are arranged in rows in pairs, wherein each magnet is opposite in magnetic polarity to its adjacent neighbors.

14. The motor of claim 1 further comprising:
    a cooling non metallic hollow tube wound through the plural rows of plural molded magnetic flux channels to carry away heat generated by the phase windings.

15. The motor of claim 14, wherein the non-metallic hollow tube is used to circulate a liquid coolant.

16. The motor of claim 1, wherein the plural phase windings comprise:
    at least three phase windings, wherein increasing the number of phase windings increases running torque and decreases clogging torque.

17. The motor of claim 1, further comprising:
    a tubeless tire mounted on the circumference of an outer surface of the rotating drum to form a wheel motor.

18. The motor of claim 17, further comprising:
    a part liquid and part gas in an area between the outer surface of the rotating drum and an inner surface of the tubeless tire for inflating the wheel tire, wherein rotation of the wheel motor causes the liquid to cool the neodymium magnets in the motor.

19. The motor of claim 1, further comprising:
    a coolant line in the hollow channel of the mounting shaft for cooling the motor.

20. The motor of claim 1, further comprising:
    a locating key on each of the plural molded magnetic flux channels;

plural corresponding locating holes on the outer circumference of the cylindrical hub for precise positioning the plural molded magnetic flux channels.

21. The motor of claim 1, wherein the motor is used as a synchronous motor.

22. The motor of claim 1, wherein the motor is used as a high efficiency generator.

23. The motor of claim 1, wherein the motor is used as a dynamo.

24. The motor of claim 1, wherein the motor is used in the hub of one of a marine propeller, a wheel motor for a vehicle, and a track wheel of a tracked vehicle.

* * * * *